US005896158A

United States Patent [19]

Brenner, Jr. et al.

[11] Patent Number: 5,896,158

[45] Date of Patent: Apr. 20, 1999

[54] SYSTEM FOR REGISTRATION OF A PHOTOCONDUCTOR BELT IN AN ELECTROPHOTOGRAPHIC IMAGING SYSTEM

[75] Inventors: Robert E. Brenner, Jr.; David A. Ender, both of New Richmond, Wis.

[73] Assignee: Imation Corp., Oakdale, Minn.

[21] Appl. No.: 08/885,439

[22] Filed: Jun. 30, 1997

[51] Int. Cl.$^{6}$ .......................... G03G 15/00; G03G 15/04; H04N 1/04

[52] U.S. Cl. .......................... 347/116; 347/234; 399/165

[58] Field of Search .......................... 399/165, 162; 347/116, 118, 129, 234, 248

[56] References Cited

U.S. PATENT DOCUMENTS

| | | | |
|---|---|---|---|
| 5,047,651 | 9/1991 | Wessner et al. | 250/548 |
| 5,208,633 | 5/1993 | Genovese | 399/162 |
| 5,319,537 | 6/1994 | Powers et al. | 347/232 |
| 5,365,074 | 11/1994 | Genovese | 250/559.29 |
| 5,442,388 | 8/1995 | Shieck | 347/116 |
| 5,550,625 | 8/1996 | Takamatsu et al. | 347/116 X |
| 5,652,282 | 7/1997 | Baker et al. | 430/116 X |
| 5,717,984 | 2/1998 | Wong | 399/165 |
| 5,737,003 | 4/1998 | Moe et al. | 347/116 |

FOREIGN PATENT DOCUMENTS

| | | |
|---|---|---|
| 0 494 105 | 8/1992 | European Pat. Off. . |
| 32 06 237 | 9/1983 | Germany . |
| 60-057040 | 2/1985 | Japan . |
| 60-178111 | 12/1985 | Japan . |
| 04016979 | 1/1992 | Japan . |
| 05-165385 | 2/1993 | Japan . |
| WO 97/19388 | 5/1997 | WIPO . |

*Primary Examiner*—S. Lee
*Attorney, Agent, or Firm*—William D. Bauer

[57] ABSTRACT

A system for registration of a photoconductor belt in a multi-color electrophotographic imaging system, which operates to detect a position of the photoconductor belt uses a photodetection system disposed adjacent a plurality of scribed lines in the photoconductor belt. The registration system also includes a belt steering system that steers the photoconductor belt based on the detected position to reduce deviation of the belt from a transport path.

23 Claims, 8 Drawing Sheets

SYSTEM FOR REGISTRATION OF A PHOTOCONDUCTOR BELT IN AN ELECTROPHOTOGRAPHIC IMAGING SYSTEM

FIELD OF THE INVENTION

The present invention relates to multi-color imaging and, more particularly, to techniques for registration of a photoconductor belt in an electrophotographic imaging system. The belt registration system includes a belt position detection system for detecting deviation of the photoconductor belt from a continuous transport path and a belt steering system that steers the photoconductor belt based on the detected position to reduce deviation of the photoconductor belt from the continuous transport path.

BACKGROUND OF THE INVENTION

In a multi-color electrophotographic imaging system, latent images are formed in an imaging region of a moving photoconductor. Each of the latent images is representative of one of a plurality of different color separation images. The color separation images together define an overall multi-color image. The color separation images may define, for example, yellow, magenta, cyan, and black components that, upon subtractive combination on output media, produce a visible representation of the multi-color image. Prior to an imaging cycle, a uniform charge is applied to the surface of the photoconductor. Each of the latent images is formed by scanning a modulated laser beam across the moving photoconductor to selectively discharge the photoconductor in an image-wise pattern. Appropriately colored developers are applied to the photoconductor after each latent image is formed to develop the latent images. The resulting color separation images ultimately are transferred to the output media to form the multi-color image.

In some electrophotographic imaging systems, the latent images are formed and developed on top of one another in a common imaging region of the photoconductor. The latent images can be formed and developed in multiple passes of the photoconductor around a continuous transport path. Alternatively, the latent images can be formed and developed in a single pass of the photoconductor around the continuous transport path. A single-pass system enables multi-color images to be assembled at extremely high speeds. An example of an electrophotographic imaging system configured to assemble a multi-color image in a single pass of a photoconductor is disclosed in co-pending U.S. patent application Ser. No. 08/537,296 to Kellie et al., filed Sep. 29, 1995, and entitled "METHOD AND APPARATUS FOR PRODUCING A MULTI-COLORED IMAGE IN AN ELECTROPHOTOGRAPHIC SYSTEM."

In an electrophotographic imaging system as described above, the latent images must be formed in precise registration with one another to produce a high quality image. In systems incorporating a photoconductor belt, precise registration can be difficult due to deviation of the belt from the transport path in a direction generally perpendicular to the transport path. Specifically, the photoconductor belt can undergo side-to-side movement (i.e., belt walking) during travel. The imaging region in which the latent images are formed is commonly fixed relative to the edge of the photoconductor belt. However, the scanning beam used to form each latent image in the imaging region is fixed relative to a start-of-scan coordinate. The side-to-side movement of the photoconductor belt, known as belt walking, can cause movement of the imaging region relative to the start-of-scan coordinate. As a result, misregistration can occur between different scan lines and between different latent images. This misregistration can significantly degrade image quality. In particular, the misregistration can produce visible artifacts in the final multi-color image upon transfer of the misregistered color separation images to the output media.

SUMMARY OF THE INVENTION

The present invention is directed to a system for registration of a photoconductor belt in an electrophotographic imaging system. The registration system operates to detect a position of a plurality of scribed lines located adjacent an edge of the photoconductor belt. In this manner, the registration system detects deviation of the photoconductor belt from a continuous transport path. The registration system includes a belt steering system that steers the photoconductor belt based on the detected position to reduce deviation of the belt from a continuous transport path. By controlling belt registration and belt steering, the system maintains the image quality of a final multi-color image upon transfer of color separation images to an output substrate.

In a first embodiment, the present invention provides a system for registration of a photoconductor belt and an electrophotographic imaging system, wherein the photoconductor belt is moved in a first direction forming a transport path and, wherein the photoconductor belt tends to deviate from the transport path in a direction substantially perpendicular to the first direction. The system includes a first scribed line located generally parallel to an edge of photoconductor belt. A second scribed line is spaced inward from the first scribed line and generally parallel to the first scribed line. A light source is positioned above the first scribed line and the second scribed line, wherein the light source includes a first discrete light portion and a second discrete light portion. A photodetection mechanism is located below the photoconductor belt. The photodetection mechanism has a first active region and a second active region, wherein the first active region is alignment with the first discrete light portion and the second active region is in alignment with the second discrete light portion. The photodetection mechanism generates a belt position detection signal representative of the position of the belt relative to the transport path in a direction substantially perpendicular to the first direction when the first discrete light portion is incident on the first active region or the second discrete light portion is incident on the second active region. The system further includes a belt steering system, and a controller for controlling the belt steering system in response to the belt position detection signal to reduce the deviation of the photoconductor belt from the transport path.

The photodetection mechanism may include a photodetector having the first active region and the second active region located thereon. The photodetection mechanism may include a first photodetector having a first active region located thereon, and a second photodetector having a second active region located thereon. The light source may include a plurality of light emitting diodes, wherein the first discrete light source includes a first light emitting diode and the second discrete light source includes a second light emitting diode. Alternatively, the light source may include a laser beam scanner. A mask may be positioned between the laser beam scanner and the photoconductor belt, the mask having a first opening and a second opening, wherein the first opening creates the first discrete light portion and the second opening creates the second discrete light portion when the laser beam scanner scans a laser beam across the mask.

The laser beam scanner may also scan a laser beam across the moving photoconductor. The system may further include a controller for modulating the laser beam based on image data to form the latent image on the photoconductor belt. Optical means may be disposed between the scanner and the photodetection mechanism for directing the laser beam to be incident on the mask at an angle generally perpendicular to the photoconductor belt.

In a second embodiment, the present invention provides a system for registration of a latent image on a photoconductor belt moving in a first direction forming a transport path, wherein the photoconductor belt is mounted about a plurality of rollers. The system includes a drive mechanism for driving the photoconductor belt to move about the rollers in the first direction, wherein the photoconductor belt tends to deviate from the transport path in a direction substantially perpendicular to the first direction. A first scribed line is located generally parallel to an edge of the photoconductor belt. A second scribed line is spaced inward from the first scribed line and generally parallel to the first scribed line. A light source may be positioned generally above the first scribed line and the second scribed line, wherein the light source includes a first discrete light portion and a second discrete light portion. A photodetection mechanism may be located below the photoconductor belt, the photodetection mechanism having a first active region and a second active region, wherein the first active region is in alignment with the first discrete light portion and the second active region is in alignment with the second discrete light portion. The photodetection mechanism generates a belt position detection signal representative of the position of the belt relative to the transport path in a direction substantially perpendicular to the first direction, when the first discrete light portion is incident on the first active region or the second discrete light portion is incident on the second active region. The system further includes a belt steering mechanism for moving the photoconductor belt in a direction substantially perpendicular to the first direction, and a belt steering controller for controlling the belt steering mechanism in response to the belt position detection signal to reduce the deviation of the photoconductor belt from the transport path.

The plurality of rollers may include a belt steering roller, wherein the belt steering roller is adjustable for moving the photoconductor belt in a lateral direction. The belt steering mechanism may include a first solenoid and a second solenoid mechanically coupled to the belt steering roller, wherein the first solenoid is responsive to the belt position detection signal for causing the belt to move in a first direction and the second solenoid is responsive to the belt position detection signal for causing the photoconductor belt to move in a second direction. The belt position detection signal may include a first detection signal from the first active region when the photoconductor belt moves in a first direction, and the belt position detection signal may include a second detection signal from the second active region when the photoconductor belt moves in a second direction. The first solenoid may be responsive to the first detection signal for moving the photoconductor belt in the first direction and the second solenoid may be responsive to the second detection signal for moving the photoconductor belt in the second direction. In one embodiment, the belt steering roller includes a first end and a second end, wherein the first solenoid is mechanically coupled to the first end, and wherein the second solenoid is mechanically coupled to the second end.

The advantages of the present invention will be set forth in part in the description that follows, and in part will be apparent from the description, or may be learned by practice of the present invention. The advantages of the present invention will be realized and attained by means particularly pointed out in the written description and claims, as well as in the appended drawings. It is to be understood, however, that both the foregoing general description and the following detailed description are exemplary and explanatory only, and not restrictive of the present invention, as claimed.

BRIEF DESCRIPTION OF THE DRAWINGS

The accompanying drawings are included to provide a further understanding of the present invention and are incorporated in and constitute a part of this specification. The drawings illustrate exemplary embodiments of the present invention and together with the description serve to explain the principles of the invention.

DETAILED DESCRIPTION OF THE PREFERRED EMBODIMENTS

The present invention provides a system for registration of a photoconductor belt in an electrophotographic imaging system. The system includes a belt position detection system utilizing scribed lines to detect deviation of the moving photoconductor belt from a continuous transport path, and a belt steering control system for steering the photoconductor belt based on the detected position to reduce deviation of the photoconductor belt from the continuous transport path.

Figure 1:
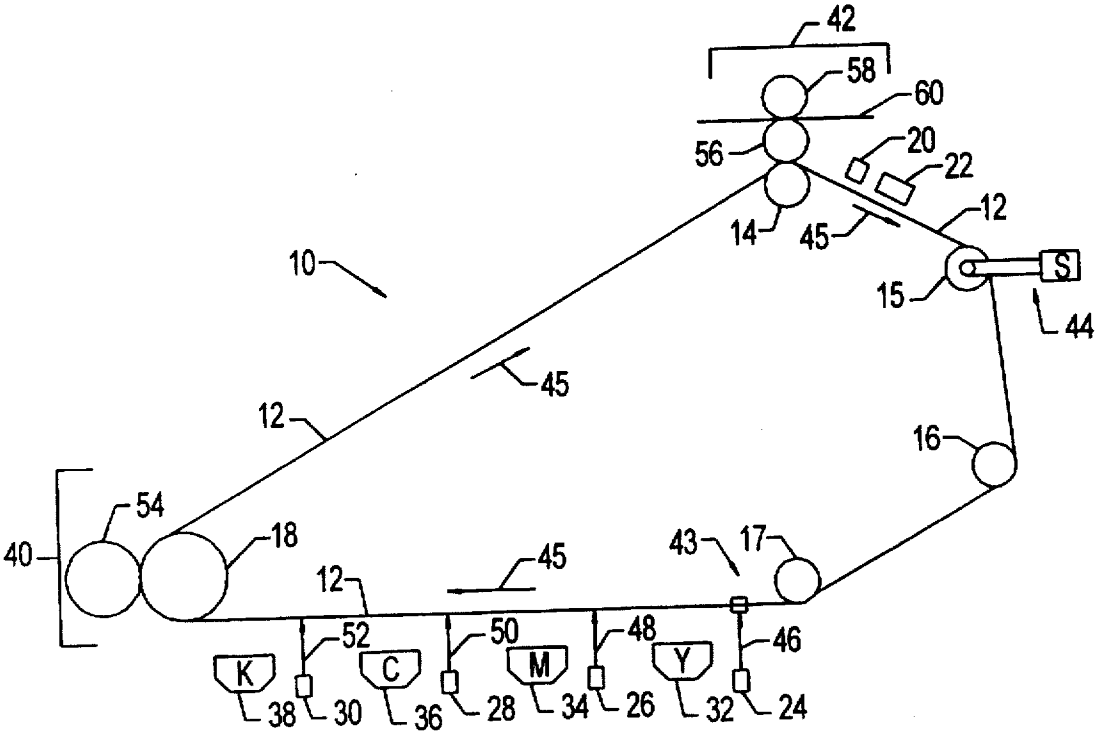
FIG. 1 is a schematic diagram conceptually illustrating an exemplary electrophotographic imaging system incorporating a system for registration of a photoconductor belt in accordance with the present invention.

FIG. 1 is a schematic diagram conceptually illustrating an exemplary electrophotographic imaging system 10 including the belt registration system having a belt position detection system and belt steering system, in accordance with the present invention. In the example of FIG. 1, imaging system 10 includes a photoconductor belt 12 mounted about a plurality of rollers 14, 15, 16, 17, 18, an erasure station 20, a charging station 22, a plurality of scanners 24, 26, 28, 30, a plurality of development stations 32, 34, 36, 38, a drying station 40, a transfer station 42, a belt position detection system 43 and a belt steering system 44. The imaging system 10 forms a multi-color image in a single pass of photoconductor belt 12 around a continuous transport path. An imaging system capable of assembling a multi-color image in a single pass of a photoconductor is disclosed, for example, in co-pending U.S. patent application Ser. No. 08/537,296 to Kellie et al., filed Sep. 29, 1995, and entitled "METHOD AND APPARATUS FOR PRODUCING A MULTI-COLORED IMAGE IN AN ELECTROPHOTOGRAPHIC SYSTEM." The entire content of the above-referenced patent application is incorporated herein by reference.

In operation of system 10, photoconductor belt 12 is driven to travel in a first direction indicated by arrows 45 along the continuous transport path. As photoconductor belt 12 moves along the transport path, erasure station 20 uniformly discharges any charge remaining on the belt from a previous imaging operation. The photoconductor belt 12 then encounters charging station 22, which uniformly charges the belt to a predetermined level. The scanners 24, 26, 28, 30 selectively discharge an imaging region of photoconductor belt 12 with laser beams 46, 48, 50, 52, respectively, to form latent electrostatic images. Each latent image is representative of one of a plurality of color separation images.

As shown in FIG. 1, each development station 32, 34, 36, 38 is disposed after one of scanners 24, 26, 28, 30, relative to the direction 45 of movement of photoconductor belt 12. Each of development stations 32, 34, 36, 38 applies a developer having a color appropriate for the color separation image represented by the particular latent image formed by the preceding scanner 24, 26, 28, 30. In the example of FIG. 1, development stations 32, 34, 36, 38 apply yellow (Y), magenta (M), cyan (C), and black developers (K), respectively, to photoconductor belt 12. A suitable developer is disclosed, for example, in co-pending U.S. patent application Ser. No. 08/536,856 to Baker et al., filed Sep. 29, 1995, entitled "LIQUID INK USING A GEL ORGANOSOL". The entire content of the above-referenced patent application is incorporated herein by reference.

As photoconductor belt 12 continues to move in direction 45, the next scanner 26, 28, 30 begins to form a latent image in the imaging region in registration with the latent image formed by the preceding scanner and developed by the preceding development station 32, 34, 36. Thus, the color separation images are formed in registration on top of one another in the same imaging region. The scanners 24, 26, 28, 30 and development stations 32, 34, 36, 38 may be spaced such that an entire latent image is formed and developed prior to formation and development of the next latent image. For increased speed and reduced size, however, each scanner 26, 28, 30 and development station 34, 36, 38 preferably begins formation and development of the next latent image prior to complete formation and development of the preceding latent image.

After scanners 24, 26, 28, 30 and development stations 32, 34, 36, 38 have formed and developed the latent images, the imaging region of the moving photoconductor belt 12 encounters drying station 40. The drying station 40 may include a heated roller 54 that forms a nip with belt roller 18. The heated roller 54 applies heat to photoconductor belt 12 to dry the developer applied by development stations 32, 34, 36, 38. The imaging region of photoconductor belt 12 next arrives at transfer station 42. The transfer station 42 includes an intermediate transfer roller 56 that forms a nip with photoconductor belt 12 over belt roller 14 and a pressure roller 58 that forms a nip with the intermediate transfer roller. The developer on photoconductor belt 12 transfers from the photoconductor belt surface to intermediate transfer roller 56 by selective adhesion. The pressure roller 58 serves to transfer the image on intermediate transfer roller 56 to an output substrate 60 by application of pressure and/or heat to the output substrate. The output substrate 60 may comprise, for example, paper or film.

Belt position detection system 43 and belt steering system 44 operate to provide a system for registration of the photoconductor belt 12. In particular, the registration system of the present invention includes the belt position detection system 43 which detects a position of the photoconductor belt 12 relative to a desired continuous transport path. The registration system includes belt steering system 44 for steering photoconductor belt 12 based on the detected position to reduce deviation of the belt from the continuous transport path. The belt steering system 44 includes a roller adjustment mechanism coupled to the roller 15 which functions to correct the positioning of the photoconductor belt 12. By controlling belt steering, the registration system of the present invention maintains the image quality of the multi-color image upon transfer of the registered color separation images to the output substrate 60.

Figure 2:
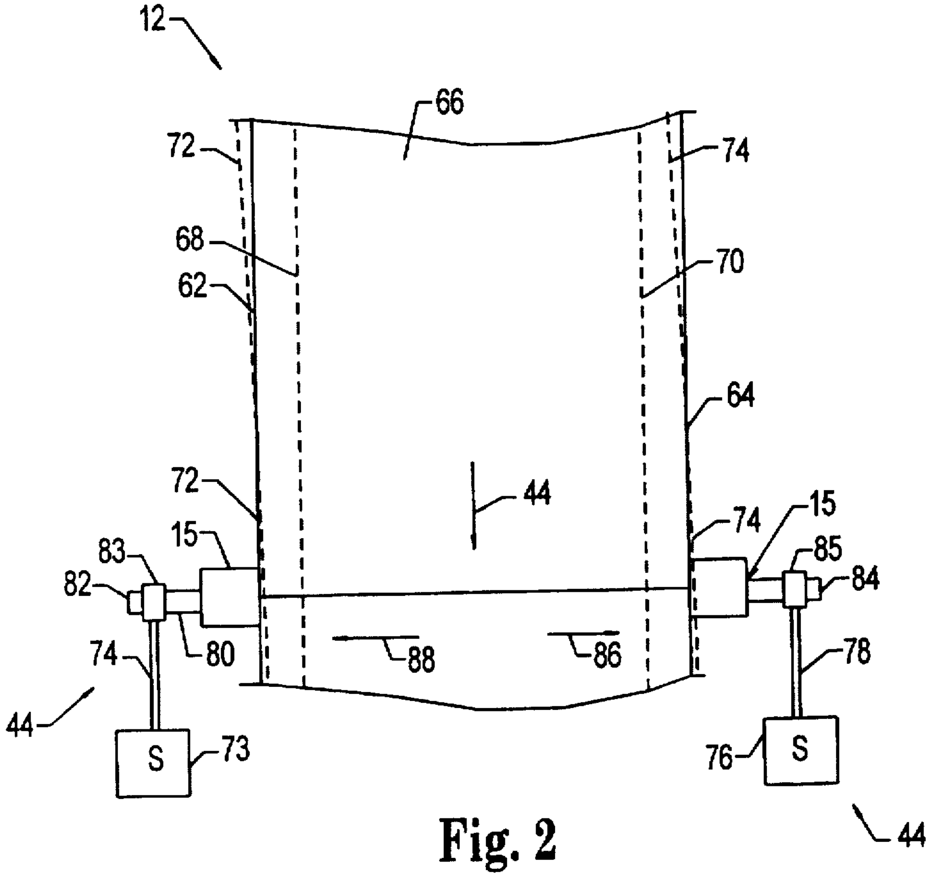
FIG. 2 is a top plan view of an exemplary photoconductor belt used in the electrophotographic imaging system of FIG. 1.

FIG. 2 is a top plan view of an exemplary photoconductor belt 12 for use in electrophotographic imaging system 10 of FIG. 1, showing one embodiment of the belt position detection system 43 and belt steering system 44 in accordance with the present invention. As shown in FIG. 2, photoconductor belt 12 includes a left belt edge 62 and a right belt edge 64. The photoconductor belt 12 also includes an imaging region 66. The imaging region 66 includes a left margin 68 positioned at a fixed distance relative to left belt edge 62, and a right margin 70 positioned at a fixed distance relative to right belt edge 64. The left and right margins 68, 70 define the width of imaging region 66 extending in a direction perpendicular to the direction 45 of movement of photoconductor belt 12. The imaging region 66 also has a length defined by top and bottom margins not shown in FIG. 2.

Each scanner 24, 26, 28, 30 is oriented to scan the respective laser beam 46, 48, 50, 52 across the width of imaging region 66 in a scan line. Movement of photoconductor belt 12 in direction 45 relative to each scanner 24, 26, 28, 30 produces a plurality of scan lines on the belt. The laser beam is modulated based on image data representative of the latent image such that each of the scan lines includes an image scan segment. The image scan segments ideally extend between the left and right margins 68, 70 and together form a latent image in imaging region 66. The first and second belt edges 62, 64 ideally extend parallel to direction 45 of movement of photoconductor belt 12. As indicated by dashed lines 72, 74, however, photoconductor belt 12 can "walk", moving from side to side during travel in direction 45, deviating slightly from the transport path.

To produce a high quality image, the latent images formed by scanners 24, 26, 28, 30 must be formed in precise registration with one another in imaging region 66. Precise registration can be difficult due to belt walking or the side-to-side movement of photoconductor belt 12 during travel. The left and right margins 68, 70 of imaging region 66 are commonly fixed relative to the left and right edges 62, 64, respectively, of photoconductor belt 12. In contrast, the scan lines and image scan segments of scanners 24, 26, 28, 30 generally are fixed relative to a start-of-scan coordinate. The side-to-side movement of photoconductor belt 12 can cause movement of imaging region 66 relative to the start-of-scan coordinate. As a result, misregistration can occur between different scan lines and between different latent images. This misregistration can significantly degrade image quality. In particular, the misregistration can produce visible artifacts in the ultimate multi-color image upon transfer of the misregistered color separation images to output substrate 60.

In accordance with the present invention, there is provided a system for registration of a photoconductor belt in an electrophotographic imaging system. The registration system of the present invention operates to detect a position of the photoconductor belt 12 using a plurality of scribed lines positioned adjacent an edge of the photoconductor belt (located outside of imaging region 66). The registration system includes a belt steering control system for steering photoconductor belt 12 based on the detected position to reduce deviation of the belt from the continuous transport path. By controlling belt steering, the registration system of the present invention maintains the image quality of the multi-color image upon transfer of the registered color separation images to output substrate 60.

The belt position detection system 43 operates to detect "belt walking" or the lateral or side-to-side movement of the photoconductor belt 12 relative to its desired transport path. The belt position detection system 43 is described in detail later in the specification. The belt position detection system is not a belt edge detection system, and as such, is not affected by belt edge defects which may exist due to manufacturing defects or use of the belt.

The belt steering system 44 may function as a roller adjustment mechanism that adjusts a position of roller 15 to move the photoconductor belt 12 in a lateral direction generally perpendicular to the direction of movement of the photoconductor belt 12 to reduce deviation of the photoconductor belt 12 from its desired transport path. The roller adjustment mechanism may be realized in a variety of different mechanisms. In the exemplary embodiment shown, the roller adjustment mechanism includes a solenoid having an actuator coupled to a center pin extending from the roller 15. The solenoid is responsive to the belt position detection system 43 for correcting the position of photoconductor belt 12 on roller 15. In particular, the roller adjustment mechanism includes a first solenoid 73 having a first actuator 75 and a second solenoid 76 having a second actuator 78. Roller 15 includes a center pin 80 extending longitudinally therethrough, along an axis generally perpendicular to the direction of movement (45) of the photoconductor belt 12. The center pin 80 includes a left end 82 and a right end 84 extending outward in opposite directions from the roller 15. Actuator 75 is mechanically (and rotatably) coupled to left end 82 (indicated at coupling 83), and actuator 78 is mechanically (and rotatably) coupled to right end 84 (indicated at coupling 85). Upon energization of solenoid 73, the actuator 75 is operated to move left end 82 outward, resulting in movement of the photoconductor belt 12 in a first direction towards the right end 84 relative to the roller 15, indicated by arrow 86 (while allowing continued rotation of roller 15). In a similar fashion, by energizing second solenoid 76, second actuator 78 operates to pull the right end 84 outward, resulting in movement of photoconductor belt 12 in a second direction towards left end 82, indicated by directional arrow 88 (while allowing continued rotation of roller 15). The control and energization of solenoid 73, 76 are responsive to the belt position detection system 43 (including a belt steering controller), and are described in detail later in the specification.

In the example of FIG. 1, imaging system 10 is a four-color imaging system. However, the registration system of the present invention can be readily applied to provide belt registration in an electrophotographic imaging system of any number of one or more latent images on a photoconductor belt. In addition, although imaging system 10 is shown as a multi-color/single-pass system in FIG. 1, the belt registration system of the present invention can be readily applied to multi-pass electrographic imaging systems requiring common registration of color separation images on a photoconductor belt. In a multi-pass imaging system, side-to-side movement of the photoconductor belt may be somewhat periodic. Thus, belt walking may be more predictable than in a single-pass system. Nevertheless, a registration system, in accordance with the present invention, is useful in a multi-pass system to improve belt registration and image quality.

Figure 3:
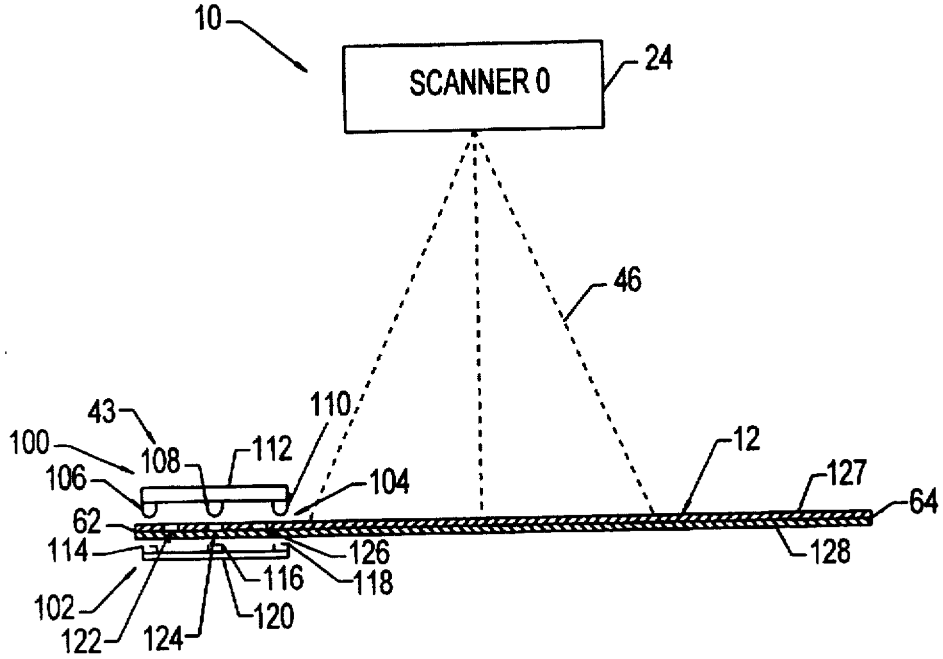
FIG. 3 is a schematic diagram illustrating an example of a belt position detector for use with a registration system, in accordance with the present invention.

FIG. 3 is a schematic diagram illustrating an example of one embodiment of the belt position detection system 43 in accordance with the belt registration system of the present invention. As shown in FIG. 3, the belt position detection system 43 includes a light source 100 and a photodetector 102. The photoconductor belt 12 includes a plurality of scribed lines 104 disposed adjacent to left edge 62 of the photoconductor belt 12. The light source 100 may be positioned above the scribed lines 104, disposed adjacent to left edge 62 of the photoconductor belt 12, and on a side of the photoconductor belt 12 having scanner 24. The photodetector 102 may be located below the scribed lines 104, and disposed adjacent to left edge 62 of the photoconductor belt 12, and on a side of the photoconductor belt 12 opposite scanner 24, and opposite the light source 100. It is also recognized that the belt position detection system 43 may be located along or adjacent the right edge 64.

In the exemplary embodiment shown, the light source 100 includes a first light emitting diode (LED) 106, a second LED 108, and a third LED 110, all coupled to a common housing 112. Similarly, photodetector 102 includes a first active region 114, a second active region 116, and a third active region 118, all coupled to housing 120. The light source 100 is in vertical alignment with photodetector 102. In particular, first LED 106 is in alignment with first active region 114, second LED 108 is in alignment with second active region 116, and third LED 110 is in alignment with third active region 118. It is also recognized that the first active region 114, the second active region 116 and the third active region 118 may be located as separate photodetectors located a known distance apart.

The plurality of scribed lines 104 include first scribed line 122, second scribed line 124, and third scribed line 126. The photoconductor belt 12 includes a generally opaque layer 127 and a generally clear or transparent substrate 128. Each scribed line 122, 124, 126 is defined by a portion of the photoconductor belt 12 generally opaque layer 127 which is removed, exposing the generally transparent substrate 128. When photoconductor belt 12 moves along a desired continuous transport path, the second LED 108 and the second active region 116 are in alignment with the second scribed line 124. As such, scribed line 124 allows light transmitted from second LED 108 to be incident on the second active region 116. When second LED 108 and second active region 116 are aligned with second scribed line 124, first LED 106 and first active region 114 are not in alignment with first scribed line 122. Similarly, third LED 110 and third active region 118 are not in alignment with third active region 126.

Figure 4:
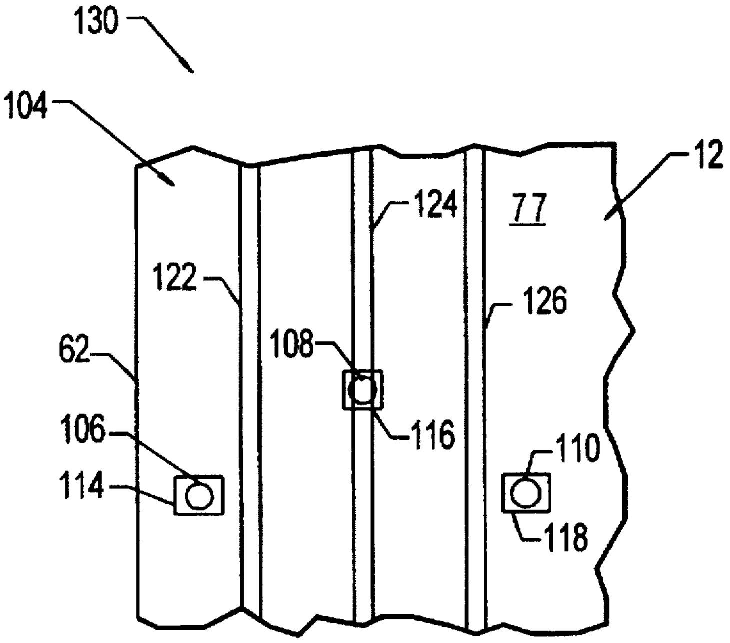
FIG. 4 is an enlarged partial top view showing a portion of the photoconductor belt having scribed lines contained therein, in accordance with the present invention.

In FIG. 4, an enlarged partial top view of the photoconductor belt 12 showing the plurality of scribed lines 104 is indicated at 130. In the exemplary embodiment shown, scribed lines 122, 124, 126 extend longitudinally, generally parallel to the photoconductor belt 12 left edge 62, continuously about the belt 12. In preparation of photoconductor belt 12, the photoconductor belt 12 is scribed (or scored) with three separate, generally continuous scribed lines 122, 124, 126 which are generally parallel to edge 62 of the photoconductor belt 12. A scoring device is positioned onto the photoconductor belt 12, while the photoconductor belt 12 is in motion. In one embodiment, the scoring device is adjusted to remove all of the layers of the photoconductor belt 12, which form generally opaque layer 27, except for the generally transparent polyester substrate 78. The scoring device then scribes or scores a continuous line onto the photoconductor belt 12 down to the polyester substrate of the photoconductor belt 12. The first scribed line 122 may be desirably located as near as possible to the edge 62. In one embodiment, each scribed line is approximately 0.75 mm wide, and may be continuous about the belt. The first scribed line 122 is located 12.5 mm from edge 62, with a spacing of 4 mm between the first scribed line 122 and the second scribed line 124, and a spacing of 4 mm between the second scribed line 124 and a third scribed line 126. It is also recognized that the scribed lines may not be located continuous about the belt. Although referred to herein as a "scribed line" or "scored line", it is recognized that other methods may be used for providing a precision opening in photoconductor belt 12 while remaining within the scope of the present invention.

One embodiment of the placement of LEDs 106, 108, 110, and sensors 114, 116, and 118 is shown relative to scribed lines 122, 124 and 126. LED 106 may be located 0.5 mm above the photoconductor belt 12 and 1 mm outside of the scored line 122 (to the edge of LED 106). It is recognized that LED 106, 108, 110 may be offset and positioned based on the desired sensitivity of the belt position detection system. The corresponding photodetector active region 114 may be located 0.5 mm below the photoconductor belt 12 and 1 mm outside of the first score line 122. Similarly, third LED 110 may be located 0.5 mm above the photoconductor belt 12 and 1 mm outside of the third scored line 126 to the edge of LED 110. The photodetector third active region 118 may be located 0.5 mm below the photoconductor belt 12 and 1 mm outside of the third scribed line 126. The placement of first LED 106 and corresponding first active region 114 and third LED 110 and corresponding third active region 118 outside of the corresponding first scribed line 122 and third scribed line 126 results in a null signal mode of operation. Since the LEDs and active regions are set outside of the scribed lines resulting in the null signal mode of operation, a high gain detection may be used to detect belt travel, providing advantages in detection system sensitivity. In particular, the presence/absence of light is detected as opposed to the degree or amount of light present on a photodetector.

It is recognized that the resolution and sensitivity of the belt position detection system is related to the distance LEDs

106, 108, 110 and corresponding sensors 114, 116 and 118 are from the corresponding scribed line 122, 124, 126. Other factors which impact the sensitivity of the system includes the sensitivity of the photodetectors and the presence of scattered light and defracted light.

As previously described herein, the photoconductor belt 12 may deviate from a continuous transport path. The side-to-side movement (belt walking) or lateral movement of the photoconductor belt during travel must be corrected in order for precise belt registration and registration of the latent images on the photoconductor 12. As such, the belt position detection system 43 detects lateral movement of the photoconductor belt 12 relative to a continuous transport path, and provides an output signal to the belt steering system 44 representative of the detected belt position. Further, by utilizing scribed lines precisely cut through the opaque portions of the photoconductor belt 12, registration errors and belt position detection errors which may occur due to defects present in the belt edge are avoided.

Figure 5:
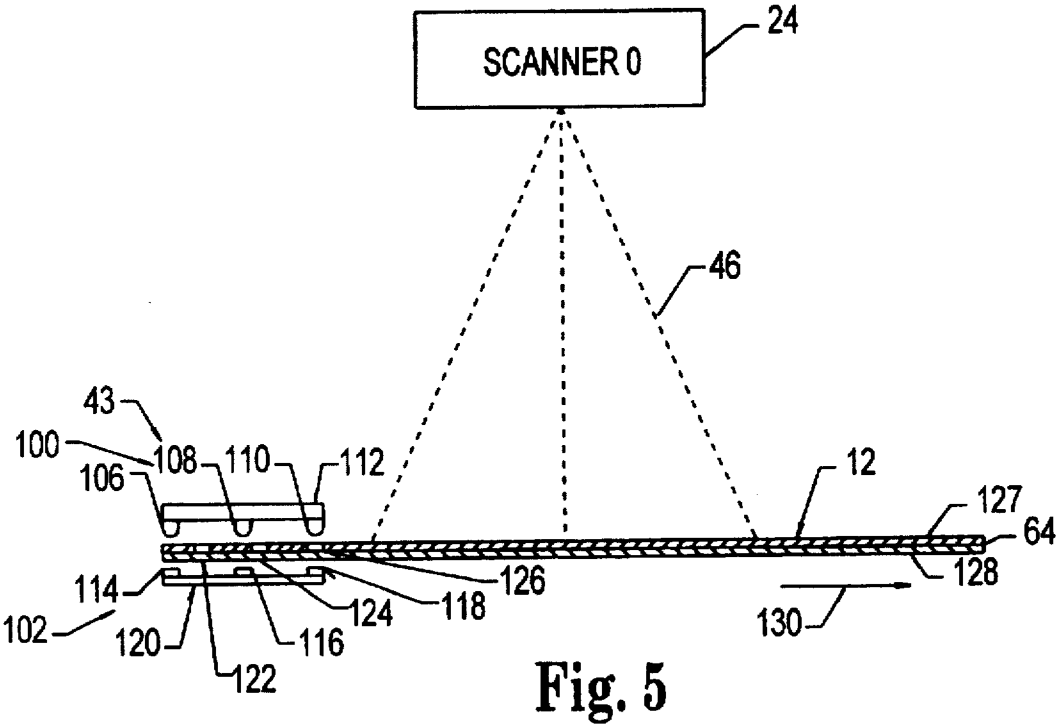
FIG. 5 is a schematic diagram illustrating an example of the belt position detector for use with a registration system, in accordance with the present invention, after lateral movement of the photoconductor belt in a first direction.

In FIG. 5, photoconductor belt 12 is shown moved laterally approximately 1 mm to the right, indicated by right directional arrow 130. As such, third LED 110 and third active region 118 are in alignment with third scribed line 126. The third scribed line 126 allows light emitted from the third LED 110 to be transmitted through the third scribed line 126 and incident on the third active region 118. Third active region 118 is responsive to the light emitted by third LED 110 for indication that the photoconductor belt 12 has moved laterally approximately 1 mm to the right, in a direction generally perpendicular to the direction of movement of the belt. Additionally, second LED 108 and second active region 116 are no longer in alignment with second scribed line 124. As such, light emitted from second LED 108 is no longer incident on and detected by second active region 116.

Figure 6:
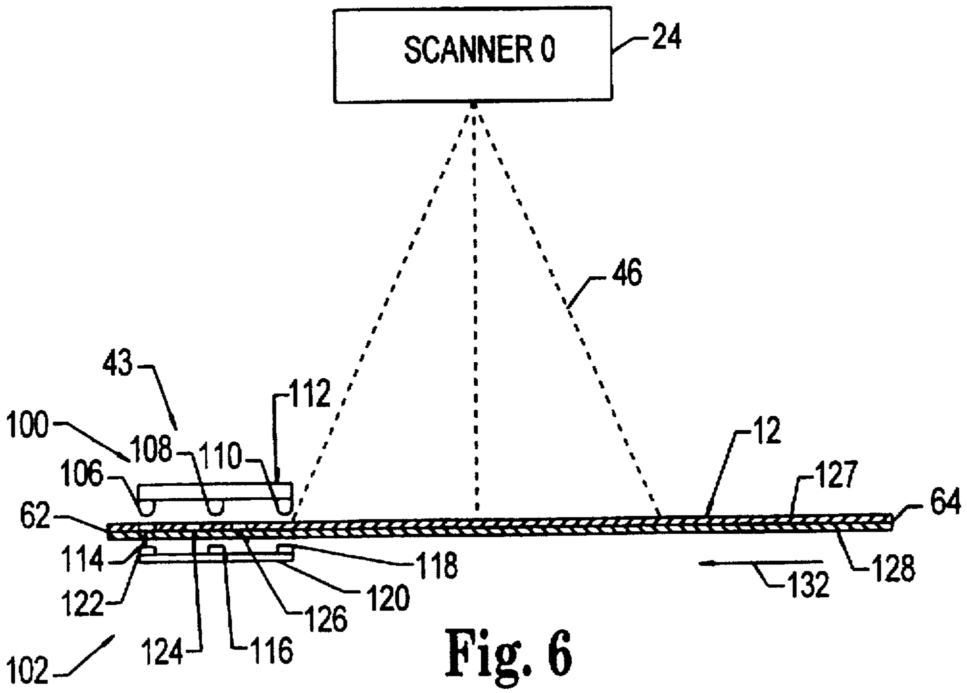
FIG. 6 is a schematic diagram illustrating an example of the belt position detector for use with a registration system in accordance with the present invention, after lateral movement of the photoconductor belt in a second direction.

In FIG. 6, photoconductor belt 12 is shown moved laterally 1 mm in the left direction, indicated by left directional arrow 132. First LED 106 and first active region 114 are now in alignment with first scribed line 122. As such, light emitted from first LED 106 is transmitted through first scribed line 122 and may be incident on and detected by first active region 114. First active region 114 is responsive to the light emitted by first LED 106 for indication that the photoconductor belt 12 has moved to the left approximately 1 mm. Additionally, since the photoconductor belt 12 has deviated from its continuous transport path, the second LED 108 and second active region 116 are no longer in alignment with the second scribed line 124.

Figure 7:
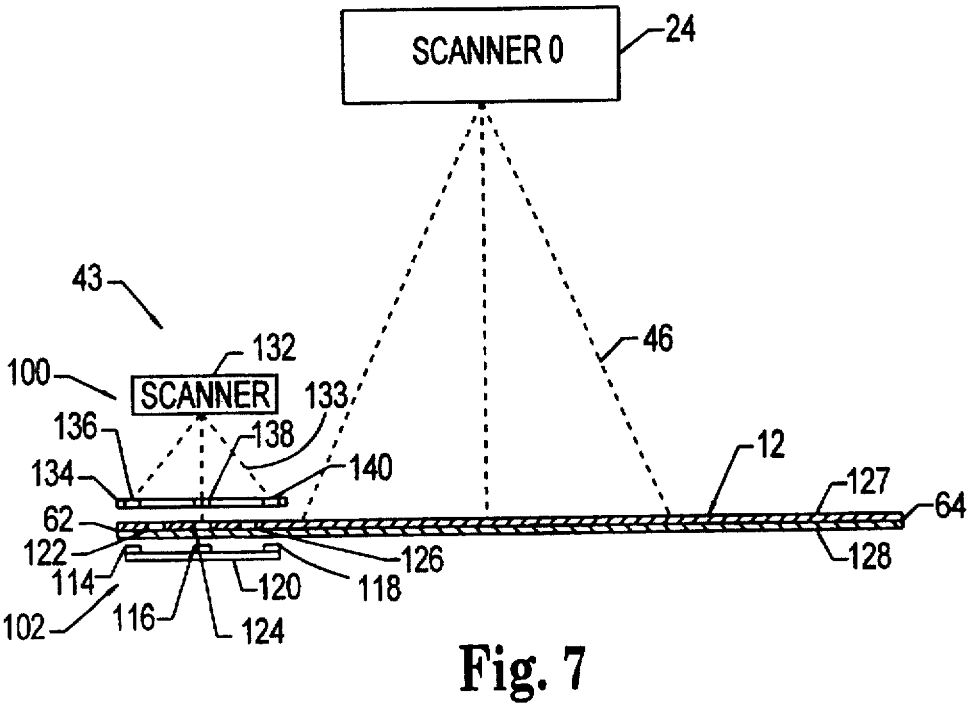
FIG. 7 is a schematic diagram illustrating another example of a belt position detector for use with a registration system, in accordance with the present invention.

In FIG. 7, a second embodiment of the light source 100 is shown. In this embodiment, the light source 100 includes a scanner 132, which can be similar to the scanner 24. Disposed between the scanner 132 and the photoconductor 12 is a mask 134. The mask 134 includes openings 136, 138, and 140, the position of which correspond to the location of the first LED 106, second LED 108, and third LED 110, as previously described herein. As such, the first opening 136 is in alignment with the first active region 114, the second opening 138 is in alignment with the second active region 116, and the third opening 110 is in direct alignment with the third active region 118. The mask 134 allows the scanner 132 laser beam 133 to simulate three discrete light sources (or portions), providing a fixed reference point similar to the LED light sources previously described herein.

In operation, scanner 132 continuously scans a laser beam across the mask 134 and corresponding first opening 136, second opening 138, and third opening 140 in a direction generally perpendicular to the direction of movement of the photoconductor belt 12. The mask 134 operates to provide a single, discrete light source through first opening 136, second opening 138 and third opening 140 which are directed to be incident on photoconductor belt 12 as a single point light source (or corresponding active regions first active region 114, second active region 116, or third active region 118). It is recognized that other optical means may be disposed between the scanner 132 and the photoconductor belt 12 for providing single point light sources in alignment with the first active region 118, second active region 116, and third active region 118.

Figure 8:
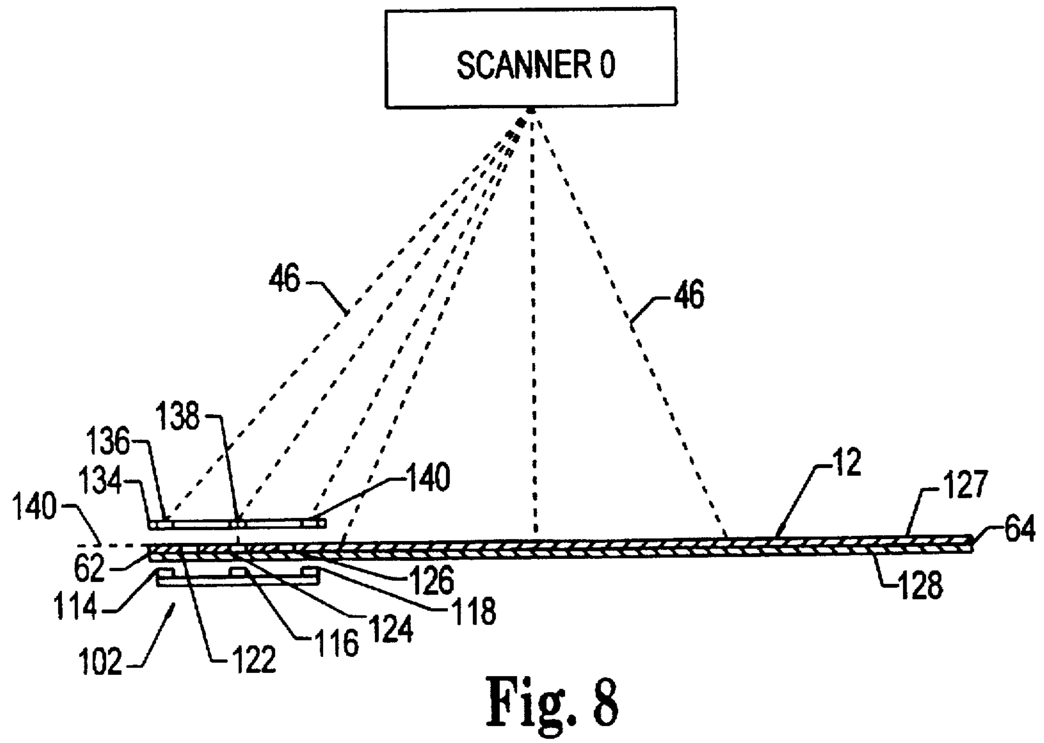
FIG. 8 is yet another example of a belt position detector for use with a registration system, in accordance with the present invention.

In FIG. 8, another embodiment of the present invention is shown. In this embodiment, as an alternative to the use of a dedicated light source to belt position detection, the use of scanners 24, 26, 28 or 30 may be used for both imaging and belt edge detection. In the exemplary embodiment shown, the use of scanner 24 for both imaging and belt edge detection may be very cost effective, less complex, and may facilitate synchronization of the belt position detection with the image scanning process.

As shown, scanner 24 scans the laser beam 46 across photoconductor belt 12 and the belt position detection system 43 in a scan line 141. The belt position detection system 43 is positioned in alignment with scanner 24 relative to the direction 44 of movement of photoconductor belt 12 to receive laser beam 46 during a portion of scan line 124.

The laser beam 46 may be used to form a latent image on photoconductor belt 12, and to facilitate detection of the position of the photoconductor belt 12 by belt position detection system 43. The scanner 24 advantageously provides both an inexpensive and precise light source for use in the belt position detection process. The scanner 24 can scan a laser beam 46 on a "full time" basis. Thus, even when the laser beam 46 emitted by scanner 24 is not being modulated to form a latent image, the scanner 24 is scanning the laser beam in a scan line for purposes of belt position detection. The scan line provided by scanner 24 extends in a direction perpendicular to the direction 44 of movement of the photoconductor belt. Movement of the photoconductor belt 12 in a direction 44 perpendicular to the scan line produces a plurality of scan lines across the photoconductor belt 12. The scanner may include, for example, a laser diode for emitting the laser beam 46, a scanning mechanism for scanning the laser beam across the photoconductor belt 12, and optics for focusing the laser beam on the photoconductor belt. The scanning mechanism may comprise, for example, a multifaceted rotating mirror controlled by a scan drive motor. As shown in FIG. 8, mask 134 directs laser beam 46 into three precisely directed discrete light sources for belt position detection.

Figure 9:
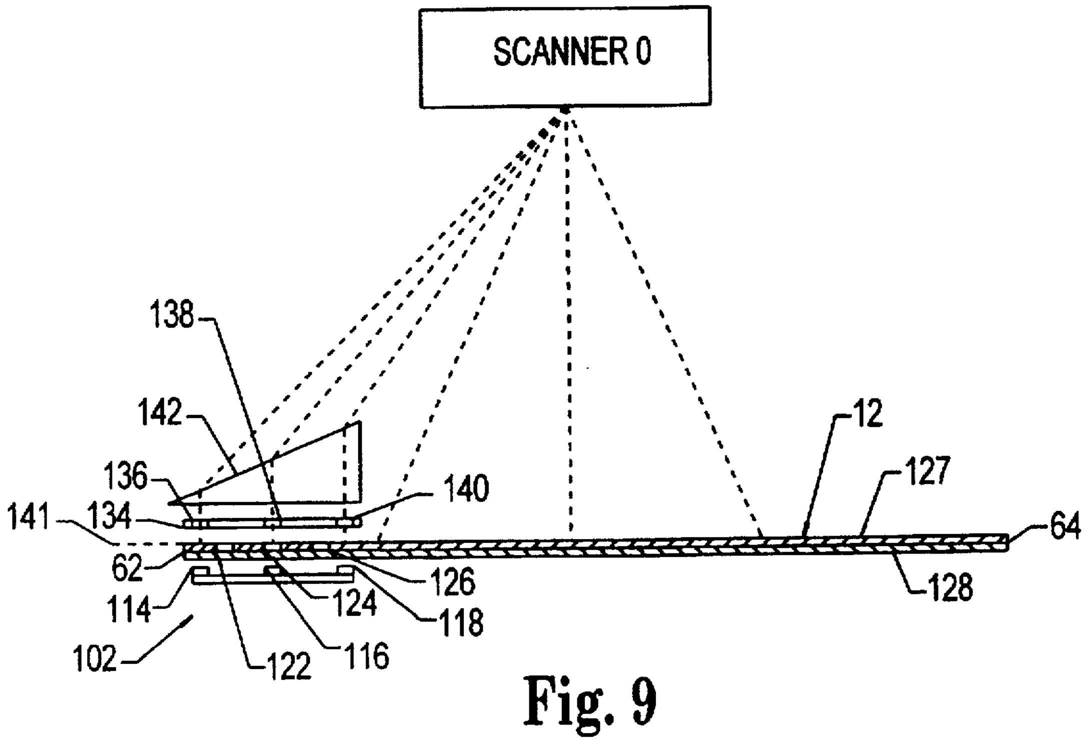
FIG. 9 is yet another example of a belt position detector for use with a registration system, in accordance with the present invention.

In FIG. 9, it is recognized that optical means 142 in the form of a correcting prism may be disposed between scanner 24 and the belt position detection system 43. In particular, the correcting prism 142 is disposed between scanner 24 and the photoconductor belt 12. The correcting prism 42 is positioned over the mask 134 and the first scribed line 122, the second scribed line 124, and the third scribed line 126, and directs laser beam 46 to pass through the mask openings 136, 138, and 140 at an angle substantially perpendicular to the photoconductor belt 12. The correcting prism 142 receives laser beam 46 at a position above the mask 134, and thereby prevents premature obstruction of the laser beam 46 by the edges of the mask openings 136, 138, and 140. The correcting prism 142 ensures that any vertical movement of the photoconductor belt 12 and the mask 134 will not be mistakenly perceived as side-to-side movement of the photoconductor belt 12.

Figure 10:
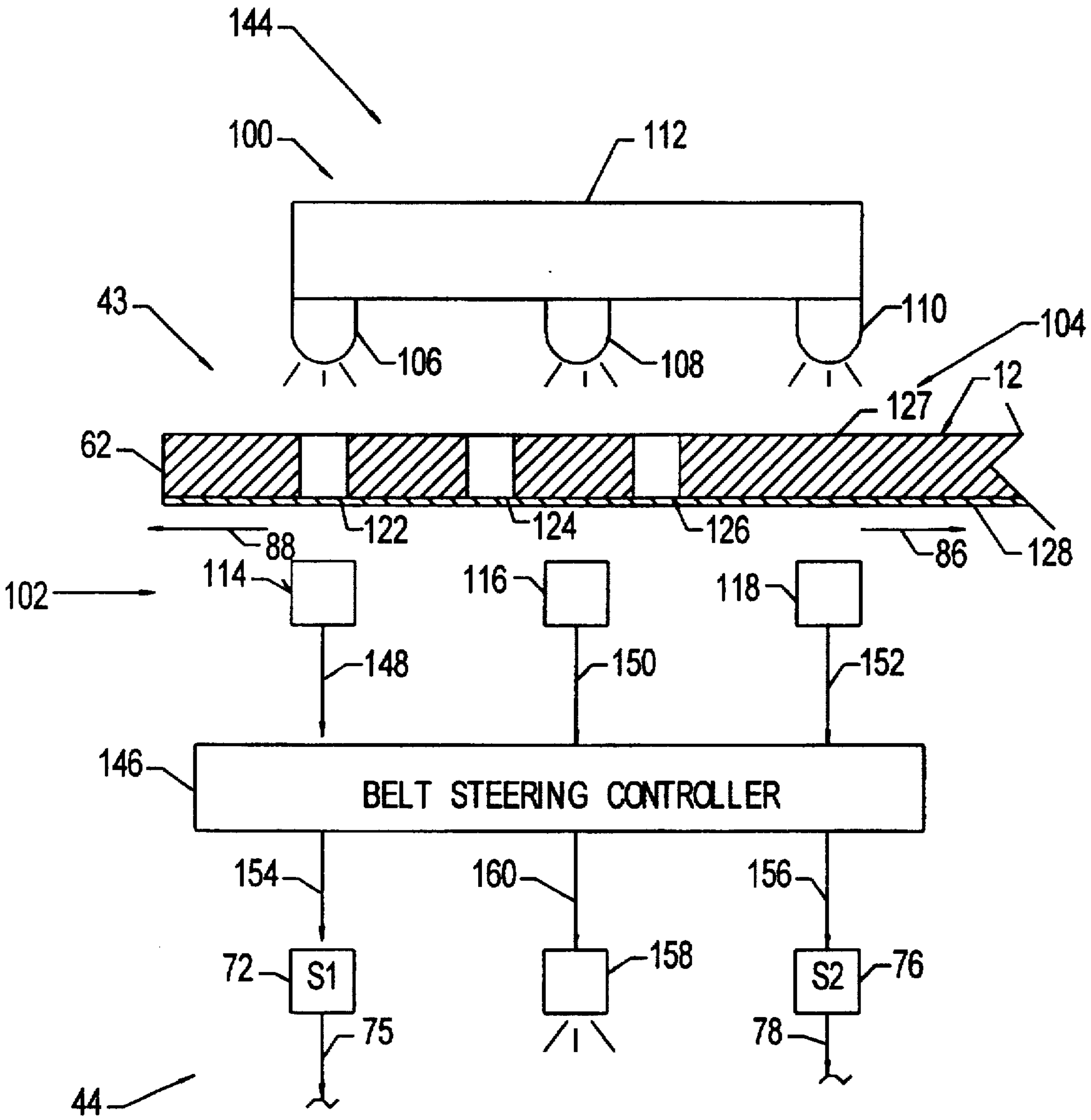
FIG. 10 is a functional block diagram illustrating a belt position detection system and a belt steering system for registration of a photoconductor belt in an electrophotographic imaging system in accordance with the present invention.

In FIG. 10, a control block diagram illustrating operation of the belt registration system, including the belt position detection system 43 and belt steering system 44, utilizing a plurality of scribed lines 104 in the photoconductor belt 12, in accordance with the present invention is generally shown. Although the belt position detection system 43 light source 100 is shown including a plurality of LEDs 106, 108, 110, it is recognized that other light sources may be used, such as a dedicated scanner or the imaging scanner as previously described herein. The light source 100 may be any suitable light source which may be configured to provide a plurality of individually directed discrete light sources and which is detectable by the photodetector 102.

As previously described herein, the belt position detection system 43 includes photoconductor belt 12 having a plurality of scribed lines 104 disposed between light source 100 and photodetector 102. The outside scribed lines, the first scribed line 102 and the third scribed line 106, are used for belt position detection. In particular, lateral motion of the photoconductor belt 12 is detected when first scribed line 122 or third scribed line 126 transmit LED light to their respective active regions 114 or 118 of the photodetector 102. The middle or second scribed line 124, and corresponding second LED 108 and second active region 116, are merely used for visual indication of the occurrence of lateral belt travel.

As shown in FIG. 10, the belt steering system 44 includes a belt steering controller 146. The belt steering controller 146 can be a microprocessor, computer, or a sequence of logic gates or switches which are capable of performing logical operations. Further, the belt steering controller 146 may be part of a scanner controller which controls the operation and modulation of laser beam scanner 24. The belt steering controller 146 is electrically coupled to the photodetector 102 first active region 114 (indicated at 148), the second active region 116 (indicated at 150), and the third active region 118 (indicated at 152). Further, the belt steering controller 146 is electrically coupled to first solenoid 73 (indicated at 154) and second solenoid 76 (indicated at 156). The belt steering controller 146 is responsive to signals 148 and 152 received from photodetector 102 for providing output signals 154, 156 for selective energization of the first solenoid 73 and second solenoid 76 in performing a belt steering operation. Additionally, the belt steering controller 146 may be electrically coupled to visual indicator 158, indicated at 160.

In operation, the first scribed line 122 in combination with first LED 106 and first active region 114, and the third scribed line 126 in combination with the third LED 110 and the third active region 118, provide directional indication of lateral movement or "walking" of photoconductor belt 12. The middle or second scribed line 124 and second LED 108 and second active region 116 are used to provide visual indication that photoconductor belt 12 has deviated from its continuous transport path. Since the second or middle scribed line 124 is used for visual indication only, the second scribed line 124 is not necessary for belt position detection in accordance with the present invention.

The belt position detection system 43 in accordance with the present invention operates in a "null" signal mode of detection. As such, with the photoconductor belt 12 properly positioned in the desired continuous transport path, the position of first LED 106 and third LED 110 preclude the transmission of light to their corresponding photodetector active regions, first active region 114 and third active region 118 (previously described herein as a "null detection" mode). Only upon lateral off-track motion of the photoconductor belt 12 will the first scribed line 122 and third scribed line 126 intersect with the light paths of the corresponding LEDs, first LED 106 and third LED 110, allowing transmission through the belt 12 (specifically substrate 128) to the corresponding first active region 114 or third active region 118 indicating belt movement for error signal generation. Due to this "null" signal mode of operation, the sensitivity of any transmitted light upon lateral belt movement can be made very high (as previously indicated herein).

During normal operation and when the photoconductor belt 12 is properly positioned and moving along its continuous transport path, second LED 108 and second active region 116 are in alignment with second scribed line 124. Upon lateral movement of photoconductor belt 12 due to deviation of the photoconductor belt 12 from a continuous transport path, second scribed line 124 is no longer in alignment with second LED 108 and second active region 116, and a loss of signal 150 occurs to belt steering controller 146. In response to a loss of signal 150 from second active region 116, the belt steering controller provides an output signal 160 to visual indicator 158 to visually indicate to an operator that belt steering is occurring.

The directionality of lateral belt motion is determined by which set of indicators and sensors generate a signal. In particular, upon lateral movement of photoconductor belt 12 in a left direction 88, first scribed line 122 comes into alignment between first LED 106 and first active region 114 (as shown). Upon the incidence of light from first LED 106 on first active region 114, signal 148 is sent to belt steering controller 146, indicating that the photoconductor belt 12 has moved in the left direction 88. In response, belt steering controller 146 provides an output signal 154 for energization of the first solenoid 73. Upon energization of first solenoid 73, actuator 75 is actuated to move the left end 82 of roller 15 outward, resulting in walking or movement of the photoconductor belt 12 in the right direction 86, returning it to its continuous transport path. Subsequent loss of signal 148 from the first active region 114 to the belt steering controller 146 indicates that the photoconductor belt 12 has returned to its continuous transport path. As such, the belt steering system 44 is deactivated by de-energizing the first solenoid 73.

Upon walking or movement of the photoconductor belt 12 in the right direction 86, third scribed line 126 will come into alignment between third LED 110 and third active region 118, allowing transmission of light from the third LED 110 to be incident on the third active region 118. In response to the detection of light on the third active region 118, output signal 152 is sent to belt steering controller 146 indicating that the photoconductor belt 12 has moved in the right direction 86. In response, the belt steering controller 146 energizes the second solenoid 76. Upon energization of the second solenoid 76, the actuator 78 moves the right end 84 of roller 15 outward, resulting in the movement or walking of photoconductor belt 12 in the left direction 88 and returning of the photoconductor belt 12 to its continuous transport path. Loss of signal from the third active region 118 to the belt steering controller 146, indicates that the photoconductor belt 12 has returned to its continuous transport path. As such, the belt steering system 44 is deactivated, and belt steering controller 146 de-energizes the second solenoid 76.

Figure 11:
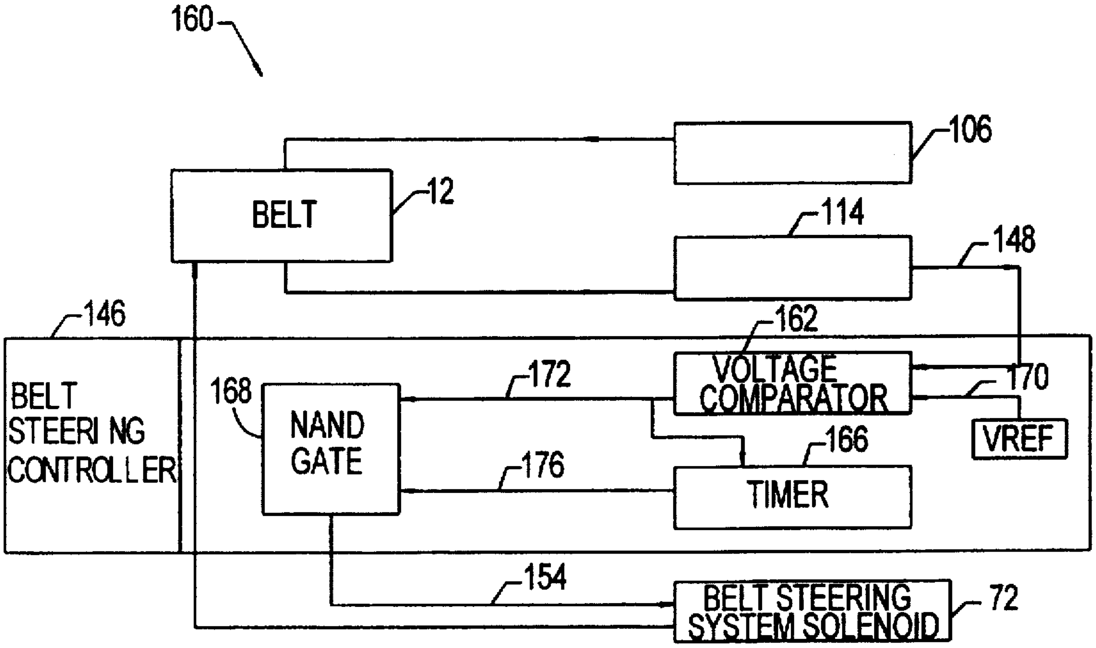
FIG. 11 is a functional block diagram illustrating another belt position detection system and a belt steering system for registration of a photoconductor belt in accordance with the present invention.

In FIG. 11, a block diagram showing one preferred embodiment of a sequence of logical operations for returning the photoconductor belt 12 to its continuous transport path is shown at 160. Although the sequence of operation will be described in reference to first LED 106, first active region 114, and belt movement in the left direction 88, this embodiment can also apply to belt movement in the right direction 86 and corresponding third LED 110 and third active region 118. As shown, the belt steering controller 146 may include a voltage comparator 162, a reference voltage VREF, a timer 166, and a NAND gate 168. Reference voltage VREF provides a reference voltage to voltage comparator 162, indicated at 170. Voltage comparator 162 provides an output signal 172 to NAND gate 168. Additionally, the output signal 172 is provided to timer 166, indicated at 174. Timer 166 provides an output signal 176 to NAND gate 168.

In operation, when the belt steering system 44 is in a deactivated state and no walking of the photoconductor belt 12 has occurred, the output signal 172 from voltage comparator 162 is high. Similarly, the output signal 176 from timer 166 is also high. Accordingly, the output signal 154 from NAND gate 168 is low, maintaining the belt steering system 172 in a deactivated state.

Upon detection of movement of photoconductor belt 12 in the left direction 88, the first active region 114 provides an input signal 148 to the voltage comparator 162. The input signal 148 is compared to reference voltage VREF. In one exemplary embodiment, the reference voltage VREF is set between 6.5 to 7 volts. This voltage is set at a desired level because of a known relationship which exists between the reference voltage and the distance traveled. The resulting output from voltage comparator 162 switches low, providing a low output signal 172 to NAND gate 168 and a low output signal 174 to timer 166. The output signal 176 from timer 166 to NAND gate 168 remains high. As such, the NAND gate output signal 154 to belt steering system solenoid 172 switches high, resulting in activation of the belt steering system solenoid 172. As previously described herein, the photoconductor belt 12 will now move in the opposite or right direction 86 reducing the deviation of the photoconductor 12 from its continuous transport path.

In one embodiment, once photoconductor belt 12 returns to its continuous transport path, the belt steering controller 146 enters a transition mode for transitioning to a deactivated state. It has been found that it may be desirable to allow the photoconductor belt 12 to continue moving in the right direction 86 for a short period of time, after the photoconductor belt 12 has returned to the desired position of the continuous transport path to allow over travel of the photoconductor belt 12. It has been found desirable to allow over travel of the belt to avoid system chattering, etc. As such, upon a detected loss of signal to the first active region 114, the resulting output signal 172 from voltage comparator 162 again switches low. Similarly, the output signal 174 from voltage comparator 162 to timer 166 transitions to a low state. The timer 166 is responsive to the transition of the output signal from voltage comparator 162 from a low signal to a high signal, and provides a low output signal 176 to NAND gate 168. As such, the high input signal 172 and low input signal 176 to NAND gate 168 maintains a high output signal 154 to the belt steering system 172.

The timer 166 may be set to provide a output signal 176 which is low for a desired amount of time to allow for a slight over travel of the photoconductor belt 12. In one preferred embodiment, the timer can be set between 0.1 seconds and 8 seconds. Once timer 166 has "timed out", the output signal 176 switches to a high state, resulting in the NAND gate output signal 154 switching to a low state and deactivation of belt steering system 72.

Figure 12:
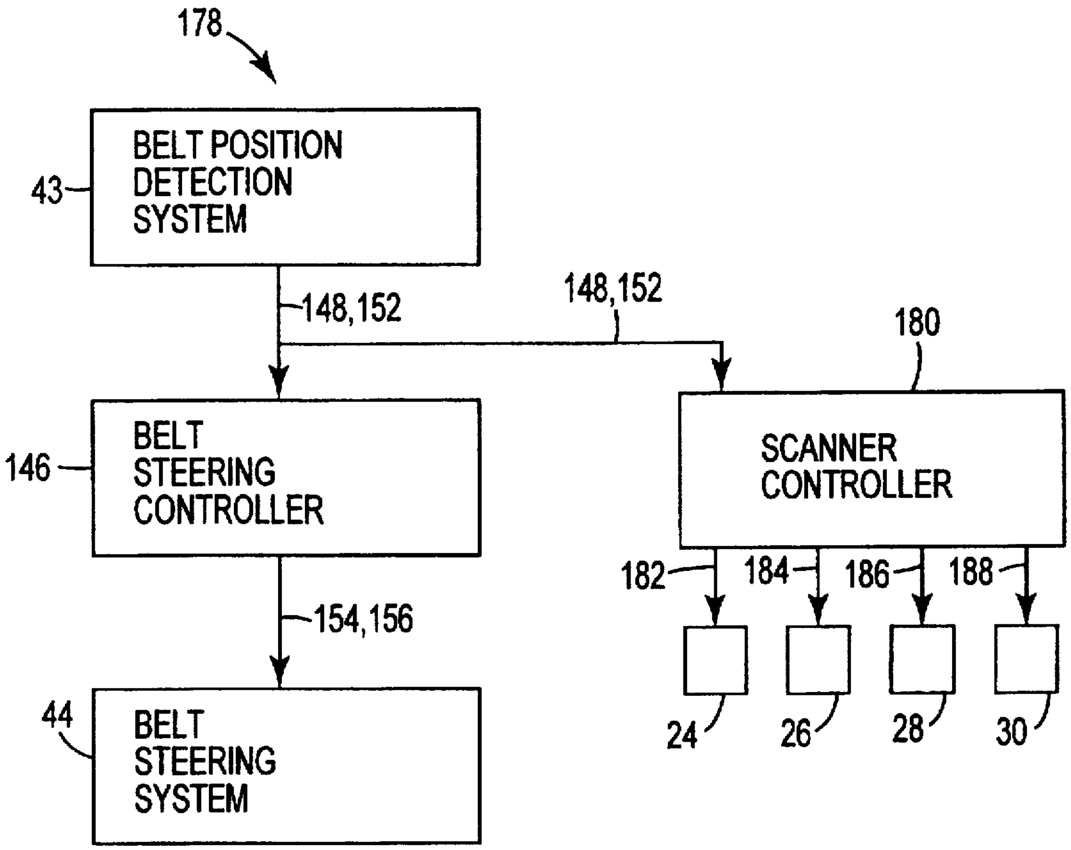
FIG. 12 is a functional block diagram illustrating a system for registration of a photoconductor belt in an electrophotographic imaging system in accordance with the present invention.

In FIG. 12 another block diagram showing a registration system in accordance with the present invention is generally indicated at 178. It is recognized that the output signals from the belt position detection system 43 may be output to a scanner controller 180 which controls the modulation of the laser scanners 24, 26, 28, 30, indicated at 182, 184, 186 and 188, and used for other control purposes. For example, based on the detected position of photoconductor belt 12, the scanner controller 180 may modulate the output signals to laser scanners 24, 26, 28 and 30 for precise registration of the latent images on the photoconductor belt 12. The belt steering controller 146 and scanner controller 180 may be a common controller.

In the exemplary embodiment shown, the scanner controller controls modulation of each laser beam 46, 48, 50, 52 based on the detected position to start each of the image scan segments at a fixed distance relative to the scribed lines 104. By controlling belt steering and laser beam scanning relative to the scribed lines 104, the registration system of the present invention maintains the image quality of the multicolor image transfer of the registered color separation images to output substrate 60, without being affected by defects which may exist along the edge of the photoconductor belt 12 due to belt manufacturing and belt use.

Numerous characteristics and advantages of the invention have been set forth in the foregoing description. It will be understood, of course, that this disclosure is, and in many respects, only illustrative. Changes can be made in details, particularly in matters of shape, size and arrangement of parts without exceeding the scope of the invention. The invention scope is defined in the language in which the appended claims are expressed.

What is claimed is:

1. A system for registration of a photoconductor belt in an electrophotographic imaging system, wherein the photoconductor belt is moved in a transport direction forming a transport path, and wherein the photoconductor belt tends to deviate from the transport path, resulting in a deviation, in a direction substantially perpendicular to the transport direction, the system comprising:

a first scribed line located generally parallel to an edge of the photoconductor belt;

a second scribed line, wherein the second scribed line is spaced inward from the first scribed line and generally parallel to the first scribed line;

a light source positioned above the first scribed line and the second scribed line, wherein the light source includes a first discrete light portion and a second discrete light portion;

a photodetection mechanism located below the photoconductor belt, the photodetection mechanism having a first active region and a second active region, wherein the first active region is in alignment with the first discrete light portion and the second active region is in alignment with the second discrete light portion, the photodetection mechanism generating a belt position detection signal representative of a position of the belt relative to the transport path in a direction substantially perpendicular to the transport direction, when the first discrete light portion is incident on the first active region or the second discrete light portion is incident on the second active region;

a belt steering system; and a controller for controlling the belt steering system in response to the belt position detection signal to reduce the deviation of the photoconductor belt from the transport path.

2. The system of claim 1, wherein the photodetection mechanism includes a photodetector having the first active region and the second active region located thereon.

3. The system of claim 1, wherein the photodetection mechanism includes a first photodetector having the first active region located thereon, and a second photodetector having the second active region located thereon.

4. The system of claim 1, wherein the light source includes a plurality of light emitting diodes, and wherein the first discrete light portion includes a first light emitting diode and the second discrete light portion includes a second light emitting diode.

5. The system of claim 1, wherein the light source includes a laser beam scanner.

6. The system of claim 5, further comprising a mask positioned between the laser beam scanner and the photoconductor belt, the mask having a first opening and a second opening, wherein the first opening creates the first discrete light portion and the second opening creates the second discrete light portion when the laser beam scanner scans a laser beam across the mask.

7. The system of claim 5, wherein the electrophotographic imaging system forms a latent image on the photoconductor, further wherein the laser beam scanner scans a laser beam across the moving photoconductor, and further comprising a controller for modulating the laser beam based on image data to form the latent image on the photoconductor belt.

8. The system of claim 7, further comprising optical means disposed between the scanner and the photodetection mechanism, for directing the laser beam to be incident on a mask at an angle generally perpendicular to the photoconductor belt.

9. A system for registration of a photoconductor belt in an electrophotographic imaging system, the photoconductor belt moving in a transport direction forming a transport path, wherein the photoconductor belt is mounted about a plurality of rollers, the system comprising:

a drive mechanism for driving the photoconductor belt to move about the rollers in the transport direction about the transport path, wherein the photoconductor belt tends to deviate from the transport path, resulting in a deviation, in a direction substantially perpendicular to the transport direction;

a first scribed line located generally parallel to an edge of the photoconductor belt;

a second scribed line, wherein the second scribed line is spaced inward from the first scribed line and generally parallel to the first scribed line;

a light source positioned above the first scribed line and the second scribed line, wherein the light source includes a first discrete light portion and a second discrete light portion;

a photodetection mechanism located below the photoconductor belt, the photodetection mechanism having a first active region and a second active region, wherein the first active region is in alignment with the first discrete light portion and the second active region is in alignment with the second discrete light portion, the photodetection mechanism generating a belt position detection signal representative of a position of the belt relative to the transport path in a direction substantially perpendicular to the transport direction, when the first discrete light portion is incident on the first active region or the second discrete light portion is incident on the second active region;

a belt steering mechanism for moving the photoconductor belt in a direction substantially perpendicular to the transport direction; and a belt steering controller for controlling the belt steering mechanism in response to the belt position detection signal to reduce the deviation of the photoconductor belt from the transport path.

10. The system of claim 9, wherein the plurality of rollers includes a belt steering roller, wherein the belt steering roller is adjustable for moving the photoconductor belt in a lateral direction.

11. The system of claim 10, wherein the belt steering mechanism includes a first solenoid and a second solenoid mechanically coupled to the belt steering roller, wherein the first solenoid is responsive to the belt position detection signal for causing the belt to moving a first direction and the second solenoid is responsive to the belt position detection signal for causing the photoconductor belt to move in a second direction.

12. The system of claim 11, wherein the belt position detection signal includes a first detection signal from the first active region when the photoconductor belt moves in the first direction, and the belt position detection signal includes a second detection signal from the second active region when the photoconductor belt moves in the second direction.

13. The system of claim 12, wherein the first solenoid is responsive to the first detection signal for moving the photoconductor belt in the first direction and the second solenoid is responsive to the second detection signal for moving the photoconductor belt in the second direction.

14. The system of claim 11, wherein the belt steering roller includes a first end and a second end, and wherein the first solenoid is mechanically coupled to the first end and wherein the second solenoid is mechanically coupled to the second end.

15. The system of claim 9, wherein the photodetection mechanism includes a photodetector having the first active region and the second active region located thereon.

16. The system of claim 9, wherein the photodetection mechanism includes a first photodetector having the first active region located thereon, and a second photodetector having the second active region located thereon.

17. The system of claim 9, wherein the light source includes a plurality of light emitting diodes, and wherein the first discrete light portion includes a first light emitting diode and the second discrete light portion includes a second light emitting diode.

18. The system of claim 9, wherein the light source includes a laser beam scanner.

19. The system of claim 18, further comprising a mask positioned between the laser beam scanner and the photoconductor belt, the mask having a first opening and a second opening, wherein the first opening creates the first discrete light portion and the second opening creates the second discrete light portion when the laser beam scanner scans a laser beam across the mask.

20. The system of claim 9, wherein the electrophotographic imaging system forms a latent image on the photoconductor, further wherein a laser beam scanner scans a laser beam across the moving photoconductor, and further comprising a controller for modulating the laser beam based on image data to form the latent image on the photoconductor belt.

21. The system of claim 20, further comprising optical means disposed between the scanner and the photodetection mechanism, for directing the laser beam to be incident on a mask at an angle generally perpendicular to the photoconductor belt.

22. The system of claim 9, further comprising:

a third scribed line scribed along the photoconductor belt, wherein the third scribed line is positioned between the first scribed line and the second scribed line; and wherein the light source includes a third discrete light portion, and wherein the photodetection mechanism includes a third active region, wherein the third active region is in alignment with the third discrete light portion, and wherein the third discrete light portion is incident on the third active region when the photoconductor belt is moving in the transport path.

23. The system of claim 22, further comprising a visual indicator electrically coupled to the third active region.

* * * * *